A. LAVOIX.
MOTOR WORKED BY EXPLOSIVE MIXTURE.
APPLICATION FILED FEB. 24, 1909.
964,030.
Patented July 12, 1910.
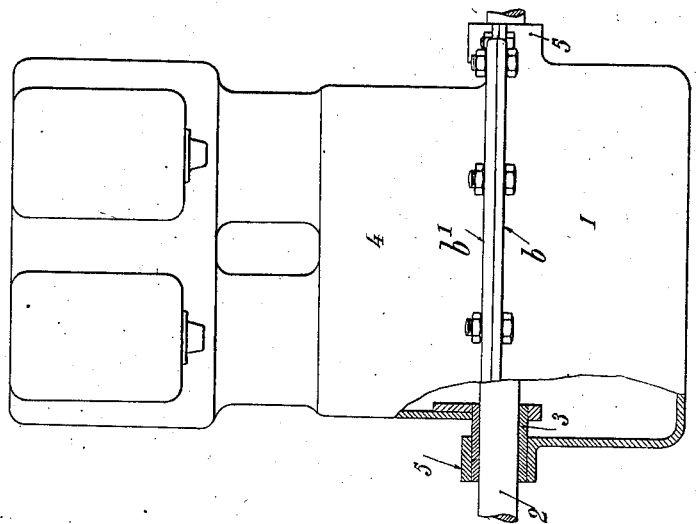
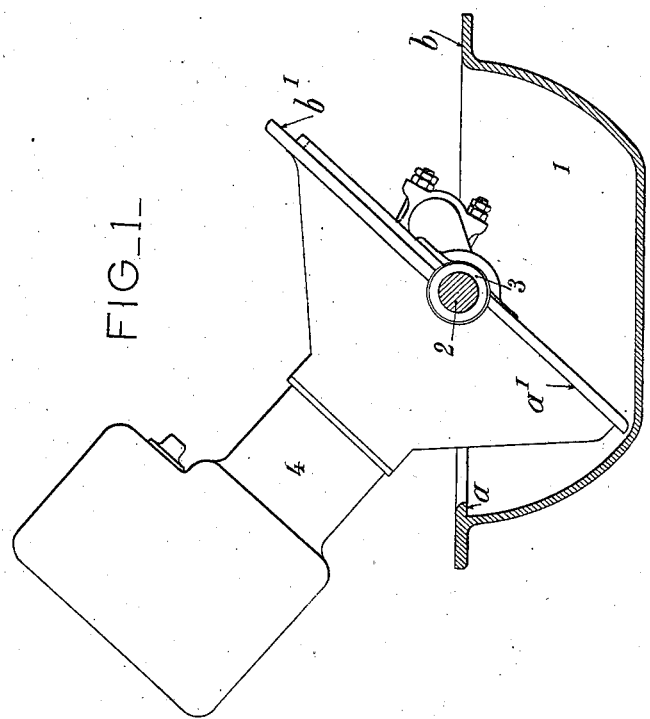
WITNESSES
W. P. Burke
John A. Percival
INVENTOR
Antoine Lavoix
BY
ATTY.
THE NORRIS PETERS CO., WASHINGTON, D. C.

UNITED STATES PATENT OFFICE.

ANTOINE LAVOIX, OF PARIS, FRANCE, ASSIGNOR TO SOCIÉTÉ FRANÇAISE DE CONSTRUCTIONS MÉCANIQUES (ANCIENS ETABLISSEMENTS CAIL), OF DENAIN, FRANCE.

MOTOR WORKED BY EXPLOSIVE MIXTURE.

964,030.  Specification of Letters Patent.  Patented July 12, 1910.

Application filed February 24, 1909.  Serial No. 479,720.

*To all whom it may concern:*

Be it known that I, ANTOINE LAVOIX, citizen of France, residing at 7 Rue de Châteaudun, Paris, in the Republic of France, have invented new and useful Improvements in Motors Worked by Explosive Mixtures, of which the following is a specification.

This invention has for object to provide means for allowing of a rapid inspection of the motive mechanism of a motor worked by an explosive mixture, and it consists in supporting the said motor along the axis of its shaft, and in enabling it to be turned on said axis in such a manner as to uncover the motive mechanism without the help of lifting appliances.

In the accompanying drawing Figure 1 is a diagrammatic sectional end view of a motor turned back on its support for the purpose of allowing of inspection of the motive mechanism, and Fig. 2 is a sectional view taken at right angles to Fig. 1 and showing the motor in its vertical normal position.

The arrangement forming the subject of the invention comprises: a fixed strong metal crank chamber 1 shown in section forming an oil reservoir, and provided at its two ends with two bearings 5 (Fig. 2) concentric with the axis of the motor shaft 2 in which can engage respectively two trunnions, 3, forming part of the motor casing, 4, in or on which are mounted all the necessary accessories for the working of the motor. The complete motor is thus enabled to turn on its trunnion, 3, as indicated in the drawing, thereby allowing of access to the interior of the crank chamber. When the motor is at work it is turned back onto the crank chamber 1, on which it is then fixed and jointed fluid-tight thereto by means of the surfaced flanges, $a$, and $a'$, $b$ and $b'$, which then come in contact respectively with each other. The advantages of this arrangement are the following:

By means of this invention, the motive mechanism of the motor can be readily uncovered and inspected very rapidly without the aid of lifting appliances.

Having now described my invention what I claim as new and desire to secure by Letters Patent is:

A motor worked by explosive mixture comprising in combination a motor casing 4, a motor shaft 2 upon which said casing is pivotally mounted, a crank chamber 1, bearings 5 secured at the ends of said chamber, trunnions 3 mounted on said bearings, made solid with the motor casing, and adapted to receive the motor shaft, jointing surfaced flanges $a$ $b$ formed at the top of the crank chamber, and jointing surfaced flanges $b'$ $c'$ formed at the bottom of the motor casing and adapted to form a fluid tight joint with the corresponding flanges on the crank chamber, substantially as described and for the purpose set forth.

In testimony whereof I have signed my name to this specification in the presence of two subscribing witnesses.

ANTOINE LAVOIX.

Witnesses:
 ALEXANDRE TOSI,
 ELLWOOD AUSTIN WELDEN.